:::::: {.columns}
::: {.column}
United States Patent Office 3,126,582
Patented Mar. 31, 1964

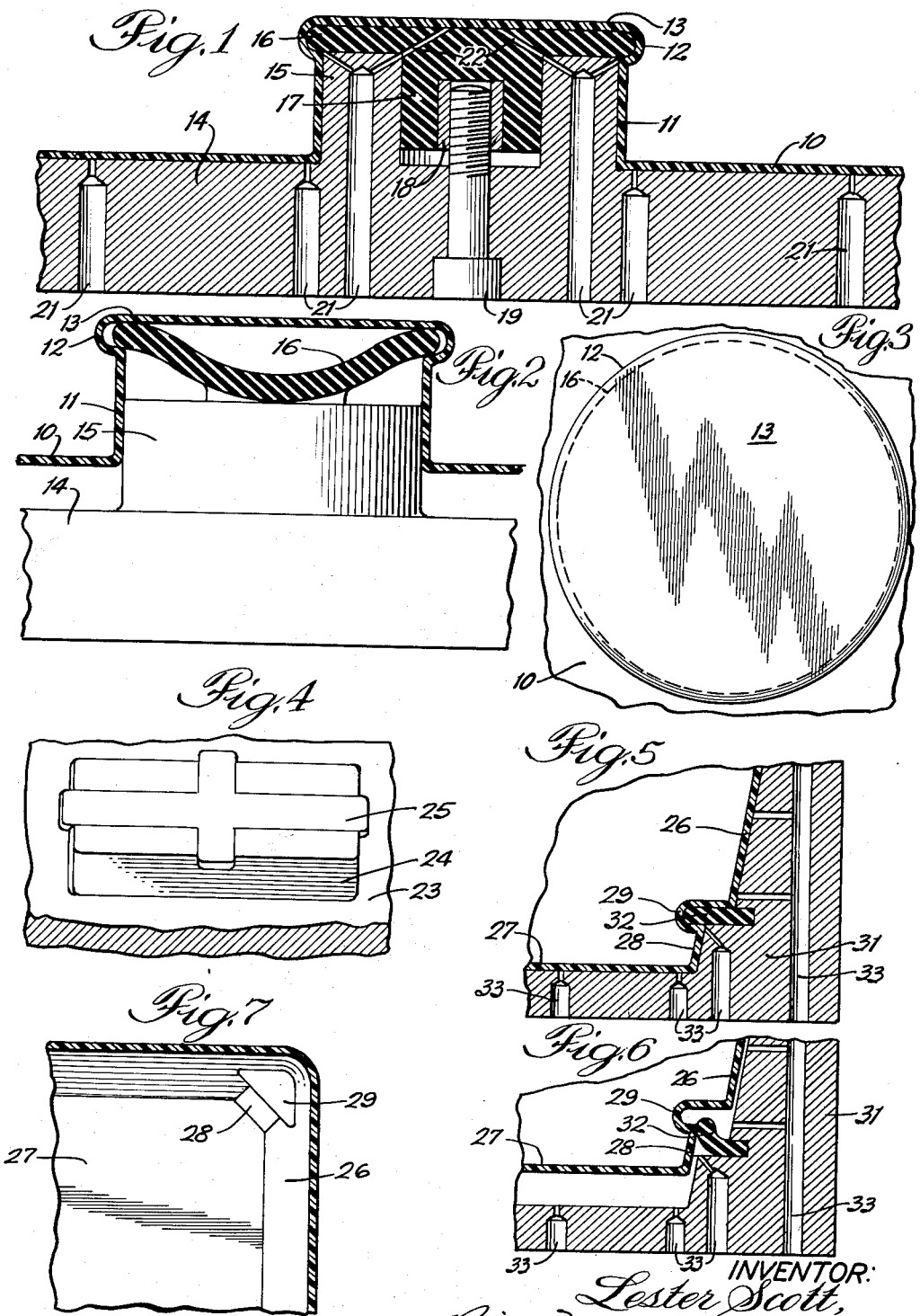

3,126,582
VACUUM MOLDING APPARATUS
Lester Scott, Evansville, Ind., assignor to Kent Plastics Corporation, Evansville, Ind., a corporation of Indiana
Filed Sept. 25, 1961, Ser. No. 140,355
2 Claims. (Cl. 18—19)

This invention relates to vacuum molding apparatus and more particularly to apparatus for molding pieces having undercut sections.

In vacuum forming or molding where undercut or reverse bend sections are to be formed, it has been the common practice to use molds having retractable parts. Such molds are difficult and expensive to make because of the very careful fitting required to eliminate parting lines in the molded piece and because movement of the parts to their extended and retracted positions must be very accurately controlled. Furthermore, such molds are relatively slow to use because of the necessity of moving the retractable parts to retracted position before stripping the piece from the mold.

It is accordingly an object of the present invention to provide a vacuum molding apparatus which is extremely simple and inexpensive to make and which functions efficiently for molding undercut or reverse bend parts.

Another object is to provide a vacuum molding apparatus in which a mold part carries a disc-like piece of resilient material attached to the mold part at a point spaced from its edge and projecting beyond its edge to form an undercut section. In stripping the formed part from the mold, the disc-like piece will deflect to allow easy removal of the formed part without the necessity of any manipulative steps.

The invention is applicable to male mold parts in which the disc-like piece overlies and projects beyond the periphery of a male mold part or to female mold parts in which the disc-like piece extends over an internal shoulder portion. The disc is secured only at a point spaced from its edge to the mold part so that the edge portion of the disc is free to flex away from the mold part for easy stripping.

The above and other objects and features of the invention will be more readily apparent from the following description when read in connection with the accompanying drawings, in which:

FIGURES 1 and 2 are central sectional views through a mold showing the molding and stripping conditions;

FIGURE 3 is a partial top view of the finished molded part;

FIGURE 4 is a partial perspective view of an alternative mold structure;

FIGURES 5 and 6 are partial sections through a female mold embodying the invention; and FIGURE 7 is a partial top view of the article formed on the mold of FIGURE 5.

The apparatus, as shown, is adapted to mold parts, such as container covers or the like, having a flat portion partially shown at 10 with a central recessed knob portion 11 which is cylindrical throughout the major portion of its height and is formed with an extended rim portion 12 and a flat top 13. This cover is selected merely to illustrate the principles of the present invention and it will be understood that many other types of articles having undercut portions can be formed with the molding apparatus of the invention.

For molding a cover, as shown in FIGURES 1 to 3, a mold part or die is provided having a flat portion 14 to form the flat portion 10 of the cover and a central cylindrical projecting portion 15 to form the cylindrical portion 11 of the knob. The projecting portion 15 has secured thereto a disc 16 of resilient material, such as rub-
:::
::: {.column}
ber or synthetic rubber, and which projects beyond the periphery of the projecting portion 15 to define the projecting flange 12 on the knob. The disc 16 may be anchored to the mold part in any desired manner, but as shown it is formed with a central hub part 17 having a threaded sleeve 18 molded therein and which fits into a central bore in the projecting part 15. A screw 19 extends upwardly through the mold part and is threaded into the sleeve to secure the disc to the projecting post 15. It will be noted that the disc is secured to the post only at its central part with its edge portions being free and loosely overlying he outer peripheral end portions of the post.

The mold part is formed, as is conventional, with passages 21 for connection to a source of vacuum to draw the softened sheet plastic around the mold part and to shape it to correspond thereto. Preferably the disc 16 is formed with passages 22 opening in the central portion in the disc at its top and communicating with certain of the passages 21 to draw the sheet plastic tightly against the top of the disc so that the desired flat upper surface will be formed on the knob.

The sheet plastic is placed over the mold part in the usual way and when vacuum is applied to the several passages 21 the sheet plastic will be drawn around the mold part to conform closely thereto, as shown in FIGURE 1. It will be noted that the plastic will be drawn around the projecting edge of the disc 16 to define the projecting bead 12 during this operation.

After the plastic has been drawn around the mold part and has set, the formed part is stripped from the mold by pulling it directly away from the mold, as shown in FIGURE 2. In this operation, the edge portions of the disc 16 will flex upwardly away from the post 15 and the extreme edges thereof which define the bead 12 will be withdrawn from the bead. In this way, the overhanging bead can be formed and can be easily stripped from the mold after formation.

FIGURE 4 illustrates a modified mold construction wherein a generally rectangular projecting knob is to be formed having short lug portions extending from the central portions of its sides. As shown, the mold includes a flat base portion 23 with a post 24 generally rectangular in outline extending upward therefrom. The post is formed in its top with cross grooves into which a rubber piece 25 is fitted. The rubber piece may be secured to the mold, as shown in FIGURE 1, or in any other desired manner with the end portions of the arms thereon lying loosely in the grooves in the top of the post and projecting slightly beyond the periphery of the post, as shown. This mold may be used in the same manner as the mold of FIGURE 1 with the end portions of the arms on piece 25 flexing upward away from the end of the post during stripping.

FIGURES 5 to 7 illustrate another application of the invention for forming an offset shoulder internally of a container for stacking or similar purposes. As shown, the mold is adapted to form a container of sheet plastic having a tapering side wall 26 and a flat bottom 27. As best seen in FIGURE 7, the container is rectangular in shape and is defined in each of its corners with an inset diagonal wall 28 joined to the side wall 26 by an inwardly projecting bead 29 which extends diagonally across the corner portion of the container.

The cup or container is formed is a female mold 31 having a recess or cavity therein corresponding in shape to the desired external shape of the container. The inner wall portions of the mold which define the container walls 26 and 28 are separated and an insert 32 of rubber or similar flexible material is placed in the separation and is of a size to project inwardly of the lower wall-forming portion. Vacuum connections 33 are provided to draw
:::
::::::

the softened plastic sheet into the mold in the usual manner.

After the sheet has been drawn into the mold and has set, it may be stripped from the mold as illustrated in FIGURE 6 by pulling it outwardly therefrom. During the stripping operation, the inserts 32 will flex upwardly, as shown in FIGURE 6, so that their edges will be withdrawn from the projecting bead 29 so that the molded container can easily be stripped from the mold.

While several embodiments of the invention have been shown and described herein, it will be understood that they are illustrative only and not to be taken as a definition of the scope of the invention, reference being had for this purpose to the appended claims.

What is claimed is:

1. Vacuum molding apparatus comprising a mold part against which a plastic sheet is to be molded and from which the molded sheet is stripped by moving it in one direction, the mold part including a first surface generally transverse to the direction of stripping movement of a molded sheet and joining a second surface generally parallel to said direction in an edge, a strip of resilient material of substantially uniform thickness overlying said first surface and projecting beyond the edge to form with the second surface an undercut portion in the molded sheet, and means securing the resilient strip to said first surface at a point spaced from the edge leaving the strip free to flex away from the first surface adjacent to the edge, the mold part being formed with vacuum passages at least one of which opens at said second surface adjacent to said edge to draw a plastic sheet closely around the projecting portion of the strip.

2. Vacuum molding apparatus comprising a male mold part terminating in a cylindrical outer end portion, a disc of resilient material overlying the outer end of the cylindrical portion and projecting beyond the periphery thereof, and means securing the central part only of the disc to the central part of the cylindrical portion while leaving the outer portions of the disc free to deflect away from the mold part, and the mold part and disc being formed with vacuum passages therein opening at the outer surfaces thereof to draw a sheet of plastic material closely therearound.

References Cited in the file of this patent

UNITED STATES PATENTS

| | | |
|---|---|---|
| 2,083,484 | Zampol | June 8, 1937 |
| 2,337,998 | Karoff | Dec. 28, 1943 |
| 2,614,310 | James | Oct. 21, 1952 |
| 2,784,455 | Pulaski | Mar. 12, 1957 |

FOREIGN PATENTS

| | | |
|---|---|---|
| 1,237,243 | France | June 20, 1960 |